(12) United States Patent
Inomata (10) Patent No.: US 9,723,174 B2
(45) Date of Patent: Aug. 1, 2017

(54) IMAGE PROCESSING APPARATUS EXTRACTING PATTERN MATCHED SYMBOL IMAGE AND REPLACING WITH SPECIFIED SYMBOL BASED ON DETERMINED DEGREE OF LOSS

(71) Applicant: FUJI XEROX CO., LTD., Tokyo (JP)

(72) Inventor: Kohshiro Inomata, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/142,751

(22) Filed: Apr. 29, 2016

(65) Prior Publication Data

US 2016/0241738 A1 Aug. 18, 2016

Related U.S. Application Data

(62) Division of application No. 14/304,162, filed on Jun. 13, 2014, now Pat. No. 9,378,413.

(30) Foreign Application Priority Data

Aug. 23, 2013 (JP) .................................. 2013-173799

(51) Int. Cl.
*H04N 1/387* (2006.01)
*H04N 1/40* (2006.01)
(Continued)

(52) U.S. Cl.
CPC ....... *H04N 1/387* (2013.01); *G06F 17/30047* (2013.01); *G06F 17/30247* (2013.01); *G06K 9/00442* (2013.01); *G06K 9/00456* (2013.01); *G06K 9/00483* (2013.01); *G06K 9/00496* (2013.01); *G06K 9/00536* (2013.01); *G06K 9/6201* (2013.01); *G06K 9/6215* (2013.01);
(Continued)

(58) Field of Classification Search
None
See application file for complete search history.

(56) References Cited

U.S. PATENT DOCUMENTS 5,566,252 A 10/1996 Miyaza
7,047,238 B2 * 5/2006 Tada ................. G06F 17/30011
(Continued)

FOREIGN PATENT DOCUMENTS

JP 07-115493 A 5/1992
JP 2007-148677 A 6/2007
(Continued)

OTHER PUBLICATIONS

Communication dated Dec. 22, 2015, from the Japanese Patent Office in counterpart application No. 2013-173799.

*Primary Examiner* — Scott A Rogers
(74) *Attorney, Agent, or Firm* — Sughrue Mion, PLLC (57) ABSTRACT

An image processing apparatus is provided. The image processing apparatus includes a data receiver, an image specifier, a replacement specifier, and a data generator. The data receiver receives data. The image specifier specifies a first image contained in the data. The replacement specifier specifies replacement data for the first image on the basis of a characteristic of the data. The data generator generates data in which the first image has been replaced with an image represented by the replacement data.

2 Claims, 5 Drawing Sheets

(51) Int. Cl.
*H04N 1/56* (2006.01)
*G06K 15/02* (2006.01)
*G06K 9/00* (2006.01)
*G06K 9/62* (2006.01)
*G06F 17/30* (2006.01)
*G06T 11/60* (2006.01)
*H04N 1/32* (2006.01)

(52) U.S. Cl.
CPC .......... *G06K 15/1889* (2013.01); *G06T 11/60* (2013.01); *H04N 1/32128* (2013.01); *H04N 1/40012* (2013.01); *H04N 1/56* (2013.01); *G06K 2009/00489* (2013.01); *G06K 2009/6213* (2013.01)

(56) References Cited

U.S. PATENT DOCUMENTS

| | | | |
|---|---|---|---|
| 7,301,672 B2 | 11/2007 | Abe et al. | |
| 7,890,486 B2 | 2/2011 | Claghorn | |
| 8,077,976 B2 | 12/2011 | Shiiyama | |
| 8,355,645 B2 | 1/2013 | Mizumukai | |
| 8,438,163 B1* | 5/2013 | Li | G06F 17/3028 382/159 |
| 9,262,104 B2* | 2/2016 | Amano | G06F 3/1222 |
| 2009/0219561 A1 | 9/2009 | Kozuka | |
| 2012/0265761 A1 | 10/2012 | Atsmon et al. | |
| 2014/0037219 A1* | 2/2014 | Setoyama | G06K 9/723 382/229 |
| 2015/0055872 A1* | 2/2015 | Inomata | G06T 11/00 382/195 |
| 2015/0213332 A1* | 7/2015 | Fujiwara | G06K 9/03 382/203 |

FOREIGN PATENT DOCUMENTS

| | | |
|---|---|---|
| JP | 2007-243729 A | 9/2007 |
| JP | 2009-55582 A | 3/2009 |
| JP | 2009-206928 A | 9/2009 |

* cited by examiner

| SYMBOL ID | CONDITION | SYMBOL IMAGE DATA |
|---|---|---|
| ABC | COLOR/SMALL | A1 — (A B C) ↕H |
| | BLACK-AND-WHITE/SMALL | (A B C) — A2 |
| | COLOR/MEDIUM | (A B C) — A3 |
| | BLACK-AND-WHITE/MEDIUM | (A B C) — A4 |
| | COLOR/LARGE | (A B C) — A5 |
| | BLACK-AND-WHITE/LARGE | (A B C) — A6 |
| | ... | ... |
| DEF | COLOR/SMALL | B1 — [D E F] ↕H |
| | BLACK-AND-WHITE/SMALL | [D E F] — B2 |
| | COLOR/MEDIUM | [D E F] — B3 |
| | BLACK-AND-WHITE/MEDIUM | [D E F] — B4 |
| | COLOR/LARGE | [D E F] — B5 |
| ... | ... | ... |

IMAGE PROCESSING APPARATUS EXTRACTING PATTERN MATCHED SYMBOL IMAGE AND REPLACING WITH SPECIFIED SYMBOL BASED ON DETERMINED DEGREE OF LOSS

CROSS-REFERENCE TO RELATED APPLICATIONS

This application is a Divisional of U.S. patent application Ser. No. 14/304,162, filed on Jun. 13, 2014, which claims priority from Japanese Patent Application No. 2013-173799 filed Aug. 23, 2013, the contents of all of which are incorporated herein by reference in their entirety.

BACKGROUND

Technical Field

The present invention relates to an image processing apparatus.

SUMMARY

According to an aspect of the present invention, there is provided an image processing apparatus including: a data receiving unit that receives data; an image specifying unit that specifies a first image contained in the data; a replacement data specifying unit that specifies replacement data for the first image on the basis of a characteristic of the data; and a data generating unit that generates data in which the first image has been replaced with an image represented by the replacement data.

BRIEF DESCRIPTION OF THE DRAWINGS

An exemplary embodiment of the present invention will be described in detail based on the following figures, wherein.

DETAILED DESCRIPTION

[Configuration]

Figure 1:
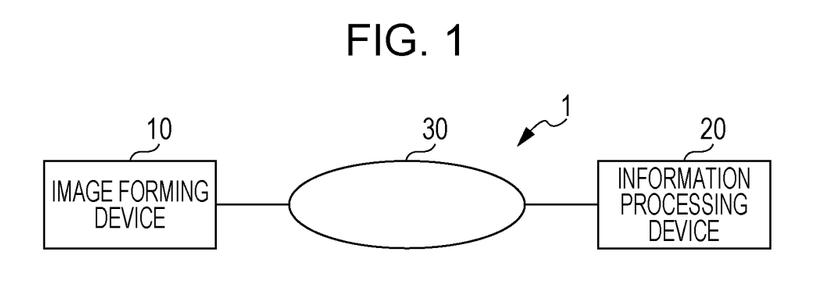
FIG. 1 is a block diagram illustrating an example of the overall configuration of a system.

FIG. 1 is a block diagram illustrating the overall configuration of a system 1 according to an exemplary embodiment of the present invention. The system 1 includes an image forming device 10 (an example of an image processing apparatus) and an information processing device 20. The image forming device 10 is an electrophotographic image forming device, for example. The image forming device 10 has an image forming function for forming an image on a recording medium such as paper, an image generating function for adding and deleting an image to and from data, a copying function for copying an image, a scanning function for reading an image formed on a recording medium, a data receiving function for receiving data from a network, and so forth. The functions of the image forming device 10 are not limited to such functions, and the image forming device 10 may have a facsimile function, for example. The image forming device 10 is not limited to having all the functions discussed above, and may be configured to have only the data receiving function and the image generating function and no other functions, for example.

The information processing device 20 is a device that transmits image data to the image forming device 10 and that specifies image processing to be performed on the image data. The information processing device 20 is a personal computer or a tablet terminal, for example. Examples of the image data include data representing documents including images, materials, and videos in addition to photographs and computer graphics (CG). A network 30 is a network such as a local area network (LAN) or a wide area network (WAN), and a communication line that connects between the image forming device 10 and the information processing device 20.

Figure 2:
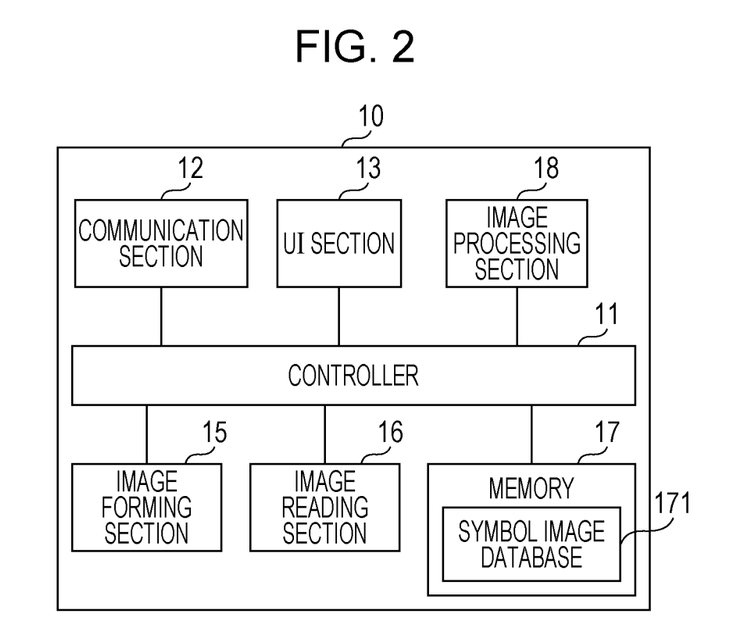
FIG. 2 is a block diagram illustrating an example of the hardware configuration of an image forming device 10.

FIG. 2 is a block diagram illustrating the hardware configuration of the image forming device 10. As illustrated in the drawing, a controller 11 includes a computation device such as a central processing unit (CPU) and a principal storage device such as a read only memory (ROM) and a random access memory (RAM). The ROM stores a program to be executed by the computation device. The computation device controls operation of various sections of the image forming device 10 by executing a program stored in the ROM or a memory 17 using the RAM as a work area. A communication section 12 communicates with the information processing device 20 by way of the network 30. A user interface (UI) section 13 includes operators such as a key and a touch sensor of various types, and supplies the controller 11 with an operation signal matching an operation performed by a user. The controller 11 performs processing matching the operation signal. The UI section 13 also includes a liquid crystal panel and a liquid crystal drive circuit, and displays an image under control by the controller 11. An image forming section 15 forms an image on a recording medium such as paper through electrophotography. An image reading section 16 optically reads an image in a document. The memory 17 is a storage device such as a hard disk, for example, and stores data and a program to be used by the controller 11. An image processing section 18 executes various types of image processing such as density conversion for converting tones and tints, image enhancement and smoothing, spatial filters for contour extraction, and geometric transformation for changing size, tilt, etc. of an image, for example. The image processing section 18 may also execute a process for character recognition such as optical character recognition (OCR) on image data, and a process for analyzing plural pieces of image data to detect a difference between such pieces. The memory 17 includes a symbol image database 171. The symbol image database 171 stores symbol image data representing a symbol image. The term "symbol image" as used in the exemplary embodiment refers to an image that symbolically represents a company name, a product name, a service name, a group name, an organization name, or the like. Examples of the symbol image include a logo image representing a company logo.

Some symbol images are required to be displayed in a determined display form. For example, some company and service logos are determined as to their color and size, and are not permitted be displayed differently.

Figure 3:
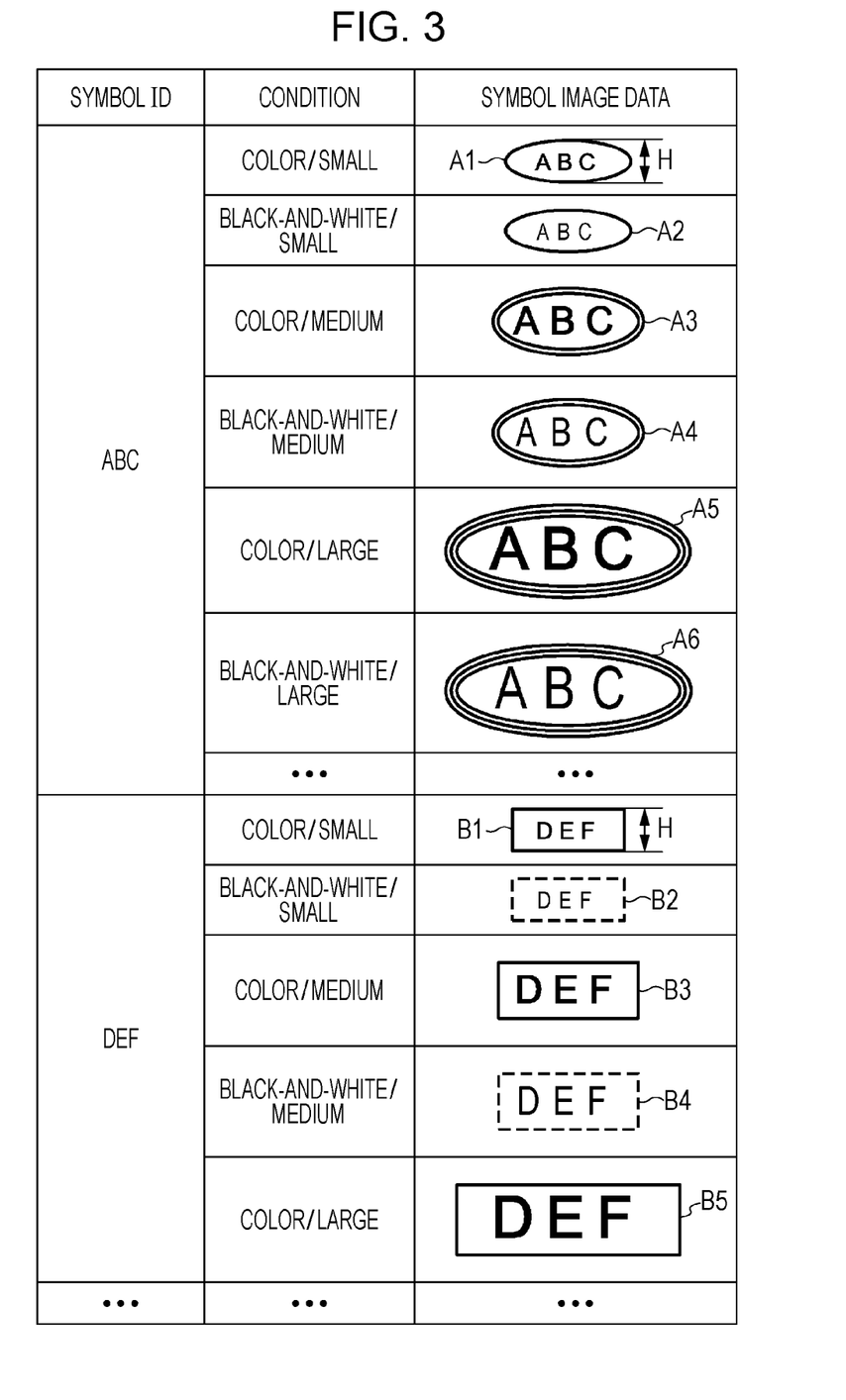
FIG. 3 illustrates an example of the content of a symbol image database.

FIG. 3 illustrates an example of the content of the symbol image database 171 (an example of a storage unit). As illustrated in the drawing, the database stores items such as "symbol ID", "condition", and "symbol image data" in association with each other. Among such items, the item "symbol ID" contains identification information (hereinafter referred to as a "symbol ID") for identifying the symbol image. The item "condition" contains information indicating conditions as to size, hue (color/black-and-white), etc. under which the symbol image is used, such as "color/small" and "black-and-white/large". The terms "small", "medium", and "large" indicate size ranges in which the height (the dimension in the direction indicated by the arrow H in the drawing) of the symbol image is 1 cm or more and less than 3 cm, 3 cm or more and less than 5 cm, and 5 cm or more and less than 10 cm, respectively. Symbol images with a height of less than 1 cm or a height of 10 cm or more do not meet the conditions provided in the example. The item "symbol image data" contains symbol image data (an example of second data) representing symbol images corresponding to the respective conditions.

In the exemplary embodiment, symbol image data representing symbol images with hue and size suitable for the respective conditions are stored in correlation with the respective conditions. For example, symbol images corresponding to the condition "color" are color images in plural colors, and symbol images corresponding to the condition "black-and-white" are binarized monochrome images in black and white. In the example illustrated in FIG. 3, for symbol images corresponding to "ABC", it is prescribed that the character string "ABC" included in the symbol image is represented in bold letters if the image is a color image, and in non-bold letters if the image is a black-and-white image. In addition, it is prescribed that the character string is surrounded by a single ellipse if the image size is "small", by a double ellipse if the image size is "medium", and by a triple ellipse if the image size if "large". For symbol images corresponding to "DEF", meanwhile, it is prescribed that the character string "DEF" is surrounded by a solid rectangle if the image is a color image, and by a broken rectangle if the image is a black-and-white image. In addition, it is prescribed that the spacing between the characters is increased as the image size becomes larger in the order of "small", "medium", and "large".

Different pieces of the symbol image data registered in the symbol image database 171 are used in accordance with the conditions such as size and hue (color/black-and-white). For example, different symbol images are used for a symbol image contained in a black-and-white document and a symbol image contained in a color document, even if the symbol images are of the same size. For example, in the case where a symbol image for "ABC" is contained in a document and a 4-cm symbol image is used, a symbol image A4 is used in a black-and-white document, and a symbol image A3 is used in a color document. Meanwhile, different symbol images are used in accordance with the size of an area in which a symbol image is to be depicted (formed). For example, for black-and-white documents, a symbol image A2 is used in the case where the height of the area in which a symbol image is to be depicted is 2 cm, and a symbol image A6 is used in the case where the height of the area in which a symbol image is to be depicted is 6 cm.

Figure 4:
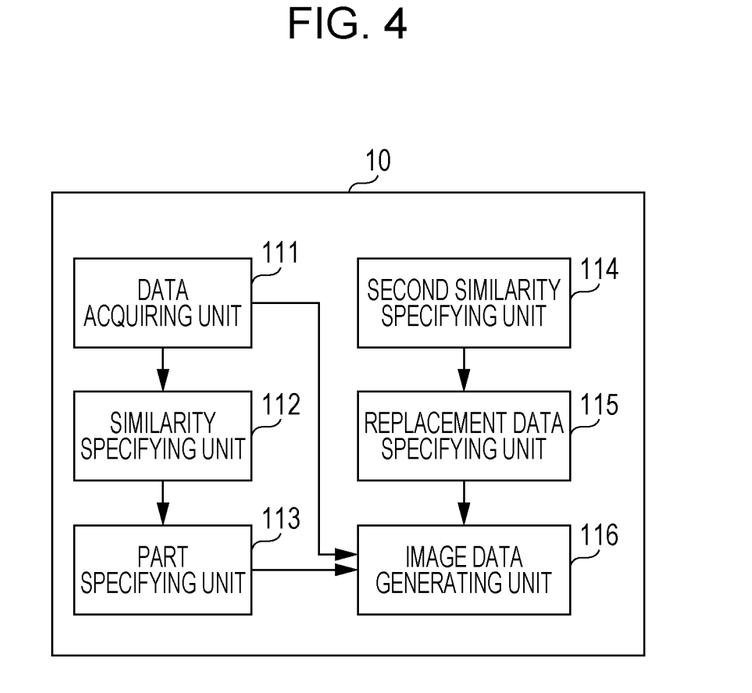
FIG. 4 illustrates an example of the functional configuration of the image forming device 10.

Next, the functional configuration of the image forming device 10 will be described with reference to the drawings. FIG. 4 is a block diagram illustrating the functional configuration of the image forming device 10. The image forming device 10 implements a data acquiring unit 111, a similarity specifying unit 112, a part specifying unit 113, a second similarity specifying unit 114, a replacement data specifying unit 115, and an image data generating unit 116 through the controller 11, the image processing section 18, or the controller 11, the communication section 12, and the image processing section 18. The data acquiring unit 111 acquires image data. The data acquiring unit 111 may acquire image data generated by the image reading section 16 by reading a document or the like, or may acquire image data transmitted from another device such as the information processing device 20 using the communication section 12, for example.

The similarity specifying unit 112 specifies a similarity between an image represented by the symbol image data stored in the symbol image database (an example of a second image) 171 and a part of an image represented by the image data acquired by the data acquiring unit 111 in accordance with a first rule. The part specifying unit (an example of an image specifying unit) 113 specifies a part of the image represented by the acquired image data that corresponds to any piece of the symbol image data stored in the symbol image database 171 on the basis of the similarity specified by the similarity specifying unit 112. The second similarity specifying unit 114 specifies a similarity between each piece of the symbol image data stored in the symbol image database 171 and image data (an example of first data) representing the part specified by the part specifying unit 113 in accordance with a second rule.

The replacement data specifying unit 115 specifies a piece of the symbol image data stored in the symbol image database 171 that corresponds to image data representing the part specified by the part specifying unit 113 as replacement data on the basis of a characteristic of the image data representing the specified part. In the exemplary embodiment, in particular, the replacement data specifying unit 115 specifies replacement data on the basis of at least one of the hue (color/black-and-white) of the image data, the background color of the symbol image contained in the image data, and the size of the symbol image. The image data generating unit 116 generates image data representing an image in which the part of the image represented by the image data specified by the part specifying unit 113 has been replaced with an image represented by the replacement data specified by the replacement data specifying unit 115.

[Operation]

Next, operation according to the exemplary embodiment will be described. In the operation example, operation for a case where image data are transmitted from the information processing device 20 to the image forming device 10 to cause the image forming section 15 to form an image on a recording medium such as paper will be described.

Figure 5:
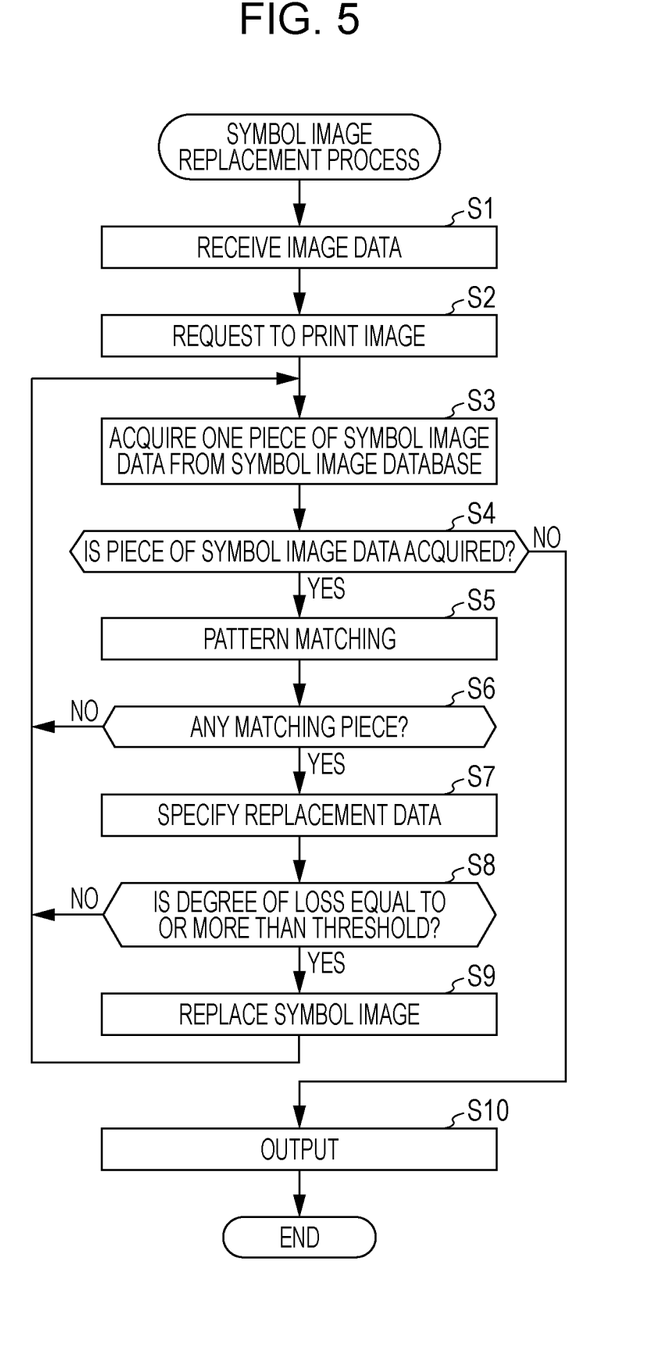
FIG. 5 is a flowchart illustrating the flow of a process performed by the image forming device 10.

FIG. 5 is a flowchart illustrating the flow of a process performed by the image forming device 10. First, the user provides a command to print image data using the UI section of the information processing device 20. In the operation example, a parameter for converting color image data into black-and-white image data (hereinafter referred to as a "monochrome conversion process") and a parameter for reducing the size of an image (hereinafter referred to as a "size reduction process") are specified as output parameters. The UI section of the information processing device 20 outputs operation information matching the content of an operation performed by the user. The controller of the information processing device 20 receives a command to print image data on the basis of the information output from the UI section. The controller of the information processing device 20 transmits image data to the image forming device 10, and requests the image forming device 10 to print specified image data. The controller 11 of the image forming device 10 receives image data from the information processing device 20 (step S1), and executes a process using the specified parameters (step S2). In the operation example, the controller 11 executes a monochrome conversion process or a size reduction process on the received image data.

Next, the controller 11 executes the processes in step S3 to step S6 to determine whether the symbol images registered in the symbol image database 171 are contained in the image data (an example of first data, hereinafter referred to as "processed data"). Specifically, the controller 11 performs a pattern matching process on the processed data using the symbol image data registered in the symbol image database 171. In the exemplary embodiment, first, the controller 11 acquires one piece of the symbol image data from the symbol image database 171 (step S3). In the case where one piece of the symbol image data is acquired (step S4: YES), the controller 11 performs a pattern matching process on the processed data using the acquired piece of the symbol image data (step S5) to determine whether the processed data contain data whose similarity with the acquired piece of the symbol image data is equal to or more than a prescribed threshold. If the similarity is equal to or more than the prescribed threshold, it is determined that the processed data contain the piece of the symbol image data. In the case where data whose similarity is equal to or more than the prescribed threshold are not extracted (step S6: NO), the controller 11 returns to the process in step S3, acquires the next piece of the symbol image data from the symbol image database 171 (step S3), and performs a pattern matching process using the acquired piece of the symbol image data (step S4 to step S6). The controller 11 repeatedly performs a pattern matching process until data whose similarity is equal to or more than the prescribed threshold are extracted.

On the other hand, in the case where no piece of the symbol image data is acquired from the symbol image database 171 in step S4 (step S4: NO), that is, in the case where pattern matching is performed for all pieces of the symbol image data registered in the symbol image database 171 and it is determined that the similarity of no piece of the symbol image data is equal to or more than the prescribed threshold, it is determined that the processed data do not contain a symbol image. In this case (step S4: NO), the controller 11 proceeds to the process in step S10, and outputs the processed data (step S10).

In the case where data whose similarity is equal to or more than the prescribed threshold are extracted in step S6, the process proceeds to the process in step S7, and the controller 11 performs a specifying process for image data for replacement (hereinafter referred to as "replacement data") (step S7). In step S7, the controller 11 specifies the replacement data on the basis of at least one of the hue (black-and-white/color) of the entire image represented by the processed data and the background color and the size of the symbol image extracted from the processed data. In the operation example, the controller 11 specifies a condition (hue (black-and-white/color) and size (large/medium/small)) of the symbol image extracted from the processed data, and specifies a piece of the symbol image data stored in the symbol image database 171 in correlation with the specified condition as the replacement data.

Next, the controller 11 performs a pattern matching process using the specified replacement data and the processed data, specifies a degree of loss (similarity) on the basis of the matching results, and determines whether the specified degree of loss is equal to or more than a prescribed threshold (step S8). In the case where the specified degree of loss is not equal to or more than the prescribed threshold (that is, the similarity between the replacement data and the processed data is equal to or more than a prescribed threshold) (step S8: NO), the controller 11 does not perform a symbol image replacement process (process in step S9). In the case where the degree of loss is equal to or more than the prescribed threshold (step S8: YES), on the other hand, the controller 11 replaces the symbol image contained in the processed data with a symbol image represented by the replacement data specified in step S7 (step S9). When the process in step S9 is finished, the controller 11 returns to the process in step S3, and performs a matching process for the remaining pieces of the symbol image data registered in the symbol image database 171.

Figure 6A:
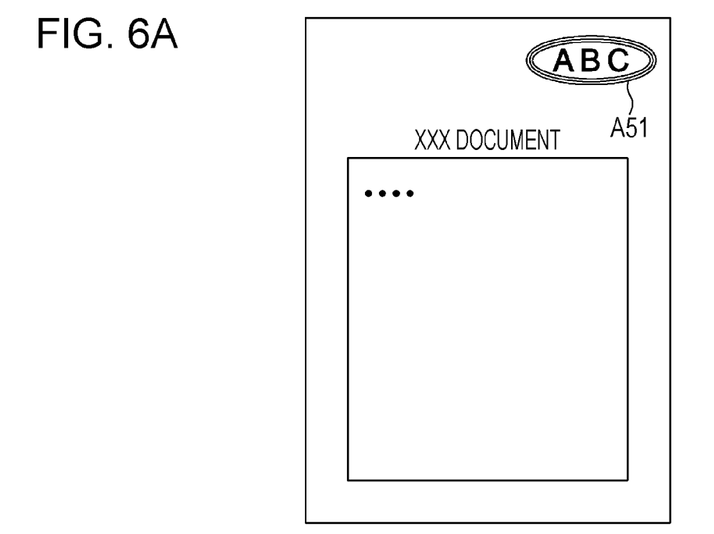
FIGS. 6A to 6C each illustrate an example of a symbol image.
Figure 6B:
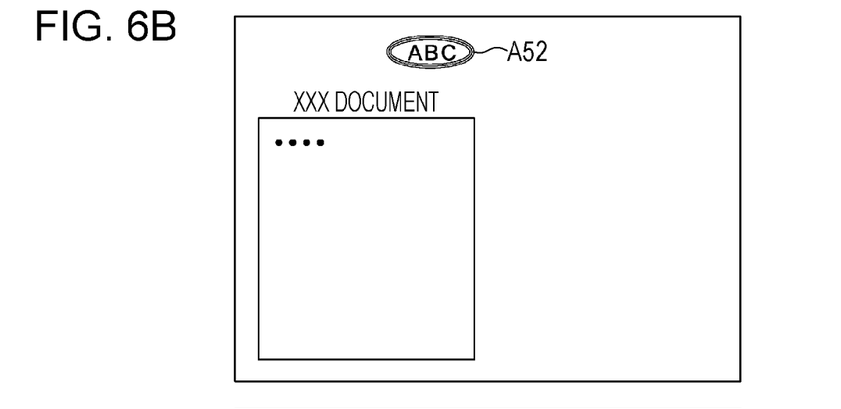
Figure 6C:
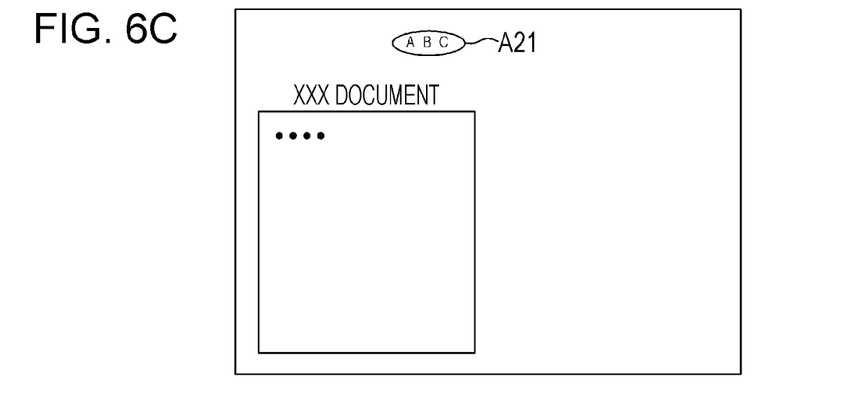

FIG. 6A to 6C each illustrate a specific example of the content of the symbol image replacement process illustrated in FIG. 5. FIG. 6A illustrates an example of an image represented by image data before being processed by the image forming device 10. FIG. 6B illustrates an image represented by image data (that is, processed data) obtained after the image forming device 10 performs image processing on the image data illustrated in FIG. 6A. In the example illustrated in FIG. 6B, a monochrome conversion process and a size reduction process have been performed. FIG. 6C illustrates an image represented by processed data obtained after the replacement process illustrated in FIG. 5 is performed on the processed data illustrated in FIG. 6B.

A symbol image A51 illustrated in FIG. 6A is converted into a monochrome image and reduced in size through a monochrome conversion process and a size reduction process to result in a symbol image A52 illustrated in FIG. 6B. The symbol image A52 is specified as a symbol image corresponding to the symbol image data AS registered in the symbol image database 171 through a pattern matching process in step S5 of FIG. 5. In step S7, in addition, from the symbol image data stored in the symbol image database 171 in correlation with the symbol ID "ABC" of the symbol image AS specified in step S5, a piece of the symbol image data that corresponds to the hue (color/black-and-white) and the size (large/medium/small) of the symbol image A52, that is, the symbol image data A2 corresponding to the condition "black-and-white/small", are specified as the replacement data. When the replacement data are specified, the degree of loss of the symbol image A52 with respect to the specified replacement data (symbol image data A2) is specified.

In the case where the calculated degree of loss is equal to or more than the prescribed threshold in the process in step S8 of FIG. 5, the symbol image data extracted from the processed data are replaced with the replacement data (symbol image data A2) specified in step S7 (step S9 of FIG. 5). As a result, the image data illustrated in FIG. 6C are generated.

[Modifications]

The exemplary embodiment discussed above is an example of the present invention, and may be modified as described below. The following modifications may be combined with each other.

(1) When the controller 11 performs the pattern matching process described in relation to step S5 of FIG. 5 on the processed data in the exemplary embodiment discussed above, a form recognition process may be performed on the processed data to specify the form of the processed data, and the controller 11 may perform a pattern matching process for a prescribed area in the specified form. In this case, the controller 11 functions as a format data acquiring unit that acquires format data representing a format, and a determination unit that determines whether or not an image represented by the processed data complies with the format represented by the format data. In the case where it is determined that an image represented by the processed data complies with the format, the controller 11 does not determine a similarity in accordance with the first rule for a portion positioned in a prescribed area of the image represented by the processed data specified by the format. Specifically, a pattern matching process may not be performed on a photograph area, for example.

(2) In the exemplary embodiment discussed above, as described in relation to step S9 of FIG. 5, the controller 11 performs a process for replacing a symbol image contained in the processed data with a replacement symbol image in the case where the degree of loss is equal to or more than the prescribed threshold. In the case where the degree of loss is equal to or more than the prescribed threshold in step S9 of FIG. 5 and the replacement symbol image does not meet a prescribed condition, the controller 11 may inform the user that the replacement symbol image does not meet such a condition, rather than performing a replacement process, and allow the user to select whether or not to perform a replacement process. For example, in the case where the size of a symbol image extracted from the processed data is so small that performing a replacement process may produce unnatural results, the controller 11 may inform the user that the size of the symbol image is so small, rather than performing a replacement process, and allow the user to select whether or not to perform a replacement process.

(3) In the exemplary embodiment discussed above, in the case where the size of a replacement symbol image is smaller than the size of a symbol image extracted from the processed data, performing a replacement process produces a blank around the replacement symbol image. Therefore, the controller 11 may perform a process for filling such a blank portion with a color that is the same as the background color of the symbol image. Specifically, the controller 11 may specify an area of the blank portion in the area of the symbol image contained in the processed data as a gap area, and fill the gap area with a color that is the same as the color of an adjacent area to fill the gap area with an image. In the case where an image in the adjacent area is not filled with a single color but contains a pattern or a picture, the controller 11 may divide the adjacent area into plural sections along the outer periphery of the adjacent area, and fill portions of the gap area that are adjacent to the respective sections with images obtained by copying the divided sections.

(4) In the case where the size of a symbol image extracted from the processed data and the size of a replacement symbol image are different from each other in the exemplary embodiment discussed above, the controller 11 may perform a replacement process after adjusting the scaling such that the size of the replacement symbol image is equal to the size of the symbol image contained in the processed data.

(5) In the exemplary embodiment discussed above, the controller 11 specifies the replacement data on the basis of a characteristic of the processed data such as the hue (black-and-white/color) of the entire image represented by the processed data and the size of the extracted symbol image (step S7 of FIG. 5). However, the method of specifying the replacement data is not limited to that described in the exemplary embodiment discussed above. For example, the controller 11 may perform a pattern matching process using symbol image data extracted from the processed data and a piece of the symbol image data registered in the symbol image database 171 that corresponds to the symbol ID of a piece of the symbol image data specified as being contained in the processed data in step S5, and specify a piece of the symbol image data which is registered in the symbol image database 171 and whose similarity determined through the pattern matching is the highest as replacement data.

In this case, the controller 11 may perform a pattern matching process using parameters such as size, aspect ratio, and hue of symbol image data extracted from the processed data to specify replacement data. In this case, the pattern matching process (hereinafter referred to as a "second pattern matching process") performed to specify replacement data employs a pattern matching method that is different from the pattern matching process in step S5.

Specifically, in the pattern matching process in step S5, discrepancies in size, aspect ratio, and hue of the symbol images may not be treated as differences. That is, in step S5, a similarity is determined even for an image with different values of parameters such as size, aspect ratio, and hue from those of a symbol image represented by the symbol image data registered in the symbol image database 171 on the basis of the values of other parameters (such as brightness), and the image is extracted as a symbol image if the similarity is equal to or more than a prescribed threshold. In step S5, the pattern matching process may be performed without reference to the values of parameters such as size, aspect ratio, and hue, or the parameters discussed above (such as size, aspect ratio, and hue) may be assigned with a light weight when reference is made in the pattern matching process.

On the other hand, the second pattern matching process is performed in accordance with the second rule which also takes differences in size, aspect ratio, and hue into consideration. Consequently, although the similarity is not low in the pattern matching process in step S5 even if the respective sizes of the symbol images are different, the similarity is calculated to be low in the second pattern matching process in the case where the respective sizes of the symbol images are different, for example. Thus, in the modification, in step S5, a pattern matching process is performed in black and white (with RBG values ignored and using brightness) by a pattern matching method in which the effect of deformation is small. Thus, a high similarity is calculated even if there is any deformation or discrepancy in color. In the second pattern matching process, on the other hand, a pattern matching process is performed in color by a pattern matching method in which the effect of deformation is large. Therefore, a low similarity is calculated even if there is any deformation or discrepancy in color.

In the case where replacement data are specified through pattern matching, the degree of loss specified in step S8 of FIG. 5 may be specified on the basis of the similarity calculated through the pattern matching, or may be specified using an algorithm that is different from the algorithm used to specify the similarity.

In another example, the controller 11 may specify the replacement data by performing a pattern matching process in consideration of the background color of symbol image data extracted from the processed data in addition to the degree of loss, for example. More specifically, the controller 11 may specify a piece of monochrome symbol image data with the smallest degree of loss in the case where the background color of the symbol image is monochrome, and may specify a piece of color symbol image data with the smallest degree of loss in the case where the background color of the symbol image is color, for example.

(6) In the exemplary embodiment discussed above, the controller 11 performs a pattern matching process in accordance with the first rule which does not take differences in size, shape (aspect ratio), and hue into consideration in step S5 of FIG. 5, and performs a pattern matching process in accordance with the second rule which takes differences in size, shape, and hue into consideration in step S7. The first rule and the second rule are not limited to those described in the exemplary embodiment discussed above. A similarity specified in accordance with the second rule may be affected by a difference in at least one of size, shape, and hue of an image to a greater degree than that specified in accordance with the first rule.

(7) In the exemplary embodiment discussed above, it may be determined whether or not a replacement process for a symbol image is performed on the basis of whether the processed data are a material for reference by the user himself/herself or a material for distribution. Specifically, when the process in step S3 of FIG. 5 is performed, the controller 11 may cause the UI section 13 to display a message inquiring whether the material is for distribution, and the user may input whether the material is for distribution using the UI section 13, for example. In this case, the controller 11 may refer to operation information output from the UI section 13 to replace the symbol image in the case where the material is for distribution, and to output the processed data as they are without performing a replacement process in the case where the material is for reference by the user himself/herself.

(8) In the exemplary embodiment discussed above, image data to be processed are transmitted from the information processing device 20 to the image forming device 10 to be input to the image forming device 10. However, the image data to be processed are not limited to data transmitted from the information processing device 20, and may be other data. For example, image data stored in a prescribed storage area (such as the memory 17) may be specified as the image data to be processed. Alternatively, the image forming device 10 may scan a medium such as paper to obtain image data.

(9) In the exemplary embodiment discussed above, the information processing device 20 provides a command for image processing specified by the user to the image forming device 10, and the image forming device 10 executes the specified image processing. The device that executes the image processing specified by the user is not limited to the image forming device 10, and the image forming device 10 may request a service providing device that provides an image processing service to execute the image processing, for example. In this case, the controller 11 of the image forming device 10 requests the service providing device to perform the image processing specified by the user, and the service providing device executes the requested image processing.

(10) In the exemplary embodiment discussed above, the controller 11 performs a replacement symbol image specifying process and a symbol image replacement process with reference to the symbol image database 171 stored in the memory 17 of the image forming device 10. However, the symbol image database 171 may not be stored in the memory 17. For example, the symbol image database 171 may be stored in a server device connected via a communication network, and the controller 11 may send an inquiry to the server device to refer to the symbol image database 171.

(11) In the exemplary embodiment discussed above, symbol image data are stored in the symbol image database 171. However, characteristic data representing the characteristics of symbol images may be stored in place of the symbol image data. Examples of the characteristic data include the brightness value of each pixel included in the symbol images and the value of a difference of the brightness value of each pixel from the average brightness value. Also in this case, as in the exemplary embodiment discussed above, the controller 11 performs a pattern matching process on the processed data using the characteristic data to execute a symbol image replacement process.

(12) In the exemplary embodiment discussed above, a pattern matching process is performed using the replacement data specified in step S8 and the processed data, a degree of loss (similarity) is specified on the basis of the matching results, and it is determined whether the specified degree of loss is equal to or more than a prescribed threshold. However, a symbol image replacement process may be performed without performing a process for specifying a degree of loss. That is, although the controller 11 calculates a degree of loss by comparing the symbol image data extracted from the processed data and the replacement data, and performs a replacement process in the case where the degree of loss is equal to or more than a prescribed threshold in the exemplary embodiment discussed above, the controller 11 may not be configured to determine whether or not to perform a replacement process. That is, the processes in step S7 and step S8 illustrated in FIG. 5 may not be performed. In this case, the controller 11 executes a replacement process, without determining whether or not to perform a replacement process, when replacement data are specified.

(13) The program executed in the image forming device 10 may be downloaded via a communication line such as the Internet. Alternatively, the program may be provided as recorded in a computer-readable recording medium such as a magnetic recording medium (such as a magnetic tape and a magnetic disk), an optical recording medium (such as an optical disc), a magneto-optical recording medium, and a semiconductor memory.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a storage that stores a plurality of symbol images and, for each symbol image, at least one corresponding characteristic of the symbol image; and
at least one microprocessor configured to:
perform image processing on image data in which the image data is converted into processed data according to at least one image conversion process;
perform a pattern matching process on the processed data using the symbol images stored in the storage to identify an image in the processed data whose similarity to a symbol image of the plurality of symbol images is greater than or equal to a similarity threshold;
extract the identified image from the processed data;
specify a symbol image, from among the stored symbol images, to replace the extracted image on the basis of a characteristic of the extracted image and the at least one corresponding characteristic of the symbol image;

perform a pattern matching process on the specified symbol image and the identified image from the processed data to determine whether a degree of loss is equal to or more than a loss threshold; and generate data in which the identified image has been replaced with the specified symbol image, when the degree of loss is greater than or equal to the loss threshold.

2. An image processing apparatus comprising:

a data receiving unit that receives a plurality of pieces of data;

a replacement data holding unit that stores, in advance, replacement data corresponding to a condition of color processing; and a data replacing unit that replaces at least one of the pieces of data received by the data receiving unit with the replacement data when the condition of color processing is set.

* * * * *